A. R. THORSON.
WATERING TROUGH.
APPLICATION FILED MAR. 30, 1917.
1,282,986.
Patented Oct. 29, 1918.
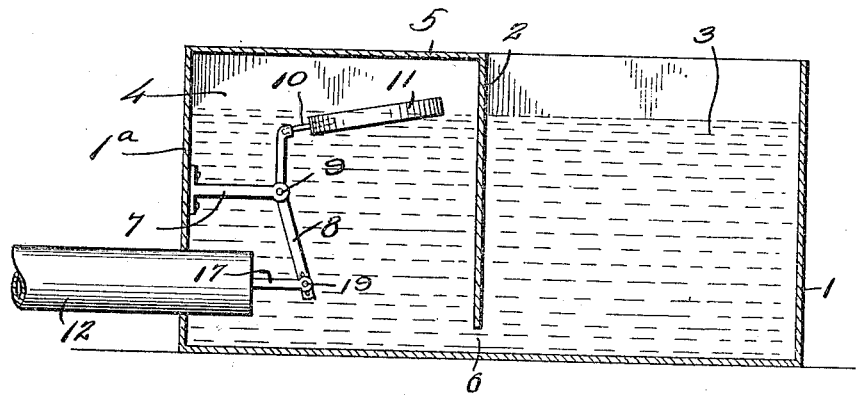
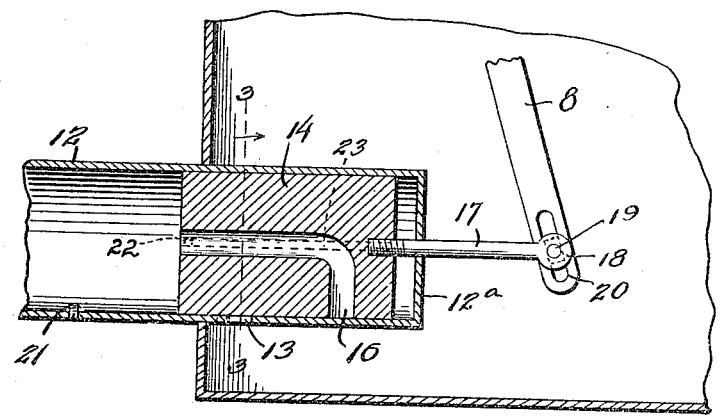
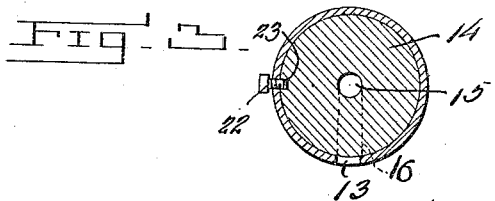
INVENTOR
Arthur R. Thorson
WITNESSES
BY
ATTORNEY

UNITED STATES PATENT OFFICE.

ARTHUR R. THORSON, OF GRACEVILLE, MINNESOTA.

WATERING-TROUGH.

1,282,986.	Specification of Letters Patent.	Patented Oct. 29, 1918.

Application filed March 30, 1917. Serial No. 158,647.

*To all whom it may concern:*

Be it known that I, ARTHUR R. THORSON, a citizen of the United States, residing at Graceville, in the county of Bigstone and State of Minnesota, have invented certain new and useful Improvements in Watering-Troughs, of which the following is a specification.

This invention relates to watering troughs, and more particularly to a trough of that class in which the supply of water to the trough is automatically controlled by float means so as to maintain the water in the trough at a substantially constant level.

One of the main objects of the invention is to provide a trough having regulating means of simple and efficient construction for controlling the flow of water into the trough, such regulating means being operated by means of a float actuated by the water in the trough. A further object is to provide a control valve of simple and efficient construction mounted in the water supply pipe and adapted to be forced inward of the pipe when the water supply is cut off so as to assist the float in holding the valve in inoperative position. A further object is to provide a control mechanism composed of a minimum of parts and which may be produced at very small cost. Further objects will appear from the detailed description.

In the drawings:—

Figure 1 is a central longitudinal vertical section through a trough constructed in accordance with my invention.

Fig. 2 is a detail sectional view through the supply pipe and control valve.

Fig. 3 is a section on line 3—3 of Fig. 2.

The trough comprises, broadly stated, a sheet metal tank 1 which is divided by a central transverse partition 2 into the watering compartment 3 which is open, and the float compartment 4 the top of which is closed by a plate 5. Direct communication is established between the float compartment and the watering compartment by means of the transversely extending passage 6 beneath the partition 2.

A bracket arm 7 is secured to the end $1^a$ of the tank and extends inward horizontally of the float compartment 4. A lever 8 is pivotally mounted on the inner end of arm 7, as at 9, so as to be rockable about a horizontal axis. A short rod 10 is secured in the upper end of this lever. A float 11 is secured on the outer end of this rod being disposed at an obtuse angle to the upper arm of the lever. It will be obvious that, as the water rises in the tank, the float 11 will be raised so as to rock the upper end of lever 8 outward, and the lower end of the lever inward, of the float compartment.

A water supply pipe 12 projects into the float compartment a short distance from the lower end thereof, through the end $1^a$ of the tank. This pipe is provided, through its under face with a discharge opening 13 into this float compartment and the inner end of pipe 12 is closed by an end wall $12^a$. A cylindrical plug-valve 14 is slidably mounted in pipe 12 and fits snugly the interior of the pipe. This valve is provided with an inwardly extending axial bore 15 which communicates at its inner end with a radially extending duct 16, this duct being so positioned as to register with the discharge opening 13 when the valve 14 is moved into proper position longitudinally of the supply pipe. A connecting rod 17 is secured in the inner end of valve 14 and is slidable through the end wall $12^a$ of pipe 12. This rod is provided at its inner end with an integral eye 18 in which is secured a pin 19 which projects through a slot 20 formed in the lower arm of lever 8 adjacent the lower end thereof. By this means, when the float 11 is raised, the lower end of lever 8 will be rocked inward so as to move the valve 14 inward. When the water in the tank has reached substantially the level shown in Fig. 1 of the drawings, the float 11 will be actuated so as to shut off the supply of water, after which the pressure of the water in pipe 12 on the outer end face of valve 14 will coöperate with float 11 to move the valve into approximately the position shown in Fig. 2 of the drawings and maintain it in this position. When the water level in the trough falls the float 11 will act to swing the lower end of lever 8 outward so as to force the valve 14 outward in the pipe 12. This outward movement of the valve is positively limited by a stop screw 21 threaded through the pipe 12. This stop screw is so positioned as to bring the discharge duct 16 of the valve into register with the discharge opening 13 of the supply pipe when the valve has been moved into its outermost position. With the valve in this position, water from supply pipe 12 will flow through bore 15 and duct 16 into the float chamber 4 and thence beneath the partition 2 into the watering compartment 3. When the water in the trough has reached the predetermined level, the float 11 will be raised sufficiently to move the valve 14 inward so as to close the end of duct 16, after which the pressure of the water from pipe 12 on the outer end of the valve will act to move the valve into substantially the position shown in Fig. 2 of the drawings, as above stated.

To insure that the duct 16 will register properly with the discharge opening 13 when the valve 14 is moved outward, means is provided for preventing rotary movement of the valve in the pipe 12. For this purpose a set screw 22 is threaded through one side of pipe 12 so as to project into a longitudinally extending groove 23 provided in the valve 14. The screws 21 and 22 coöperate to insure that the discharge duct of the valve will be brought into proper register with the discharge opening of the water supply pipe by preventing rotary movement of the valve and positively limiting outward movement of the valve, in the water supply pipe.

A watering trough constructed in accordance with my invention may be produced at very small cost, and is provided with an automatic supply control means composed of a minimum of parts of very simple and durable construction which cannot easily become disarranged. The partition 2 and cover plate 5 of the float compartment effectually eliminate all danger of interference with the proper operation of the supply control means, as will be obvious.

What I claim is:—

In watering troughs, a tank, a supply pipe extending into the tank and provided with a discharge opening positioned within said tank, a cylindrical valve slidably mounted within said pipe and fitting snugly in the same, the body of said valve being solid and of uniform diameter throughout its full length and having an axial bore extending from its outer end to within a short distance of its inner end, the valve being further provided with a radial discharge duct communicating with the inner end of said bore and so positioned as to register with the discharge opening of the supply pipe when the valve is in its outermost position, said valve being of great cross area relative to the cross area of the bore whereby the pressure of water in the supply pipe on the outer end of the valve acts to normally maintain the same in its innermost position, and float operated means for moving said valve outwardly so as to bring the discharge duct into register with the opening in said pipe when the water in the trough falls below a predetermined level.

In testimony whereof I affix my signature in presence of two witnesses.

ARTHUR R. THORSON.

Witnesses:
EDWARD GETTMAN,
F. J. DOEMER.

Copies of this patent may be obtained for five cents each, by addressing the "Commissioner of Patents, Washington, D. C."